US 6,744,747 B2

(12) United States Patent
Shiu et al.

(10) Patent No.: US 6,744,747 B2
(45) Date of Patent: Jun. 1, 2004

(54) METHOD & APPARATUS FOR W-CDMA HANDOFF SEARCHING

(75) Inventors: Da-Shan Shiu, San Jose, CA (US); Parvathanathan Subrahmanya, Sunnyvale, CA (US); Subramanya P.N. Rao, San Jose, CA (US)

(73) Assignee: Qualcomm, Incorporated, San Diego, CA (US)

( * ) Notice: Subject to any disclaimer, the term of this patent is extended or adjusted under 35 U.S.C. 154(b) by 90 days.

(21) Appl. No.: 09/935,505

(22) Filed: Aug. 22, 2001

(65) Prior Publication Data

US 2003/0039228 A1 Feb. 27, 2003

(51) Int. Cl.[7] .................. H04Q 7/00; H04B 7/216
(52) U.S. Cl. ............... 370/331; 370/335; 370/342; 380/268; 380/270
(58) Field of Search ............... 370/331, 335, 370/342, 350; 375/150, 152; 455/436, 442; 380/268, 270, 274

(56) References Cited

U.S. PATENT DOCUMENTS

| 5,930,366 | A | * | 7/1999 | Jamal et al. | |
| 5,991,330 | A | * | 11/1999 | Dahlman et al. | 375/200 |
| 6,101,175 | A | * | 8/2000 | Schorman et al. | 370/331 |
| 6,356,763 | B1 | * | 3/2002 | Kangas et al. | 455/456 |
| 6,480,558 | B1 | * | 11/2002 | Ottosson et al. | 375/350 |
| 6,526,039 | B1 | * | 2/2003 | Dahlman et al. | |

FOREIGN PATENT DOCUMENTS

| EP | 1009105 | 6/2000 |
| WO | 0101596 | 1/2001 |

OTHER PUBLICATIONS

Wang, et al., *Cell Search Algorithms and Optimization in W–CDMA*, VTC 2000 IEEE Vehicular Technology Conference, 51st, vol. 2 of 3, No. 51 (2000).

* cited by examiner

Primary Examiner—Alphus H. Hsu
Assistant Examiner—Toan D. Nguyen
(74) Attorney, Agent, or Firm—Philip R. Wadsworth; Charles D. Brown; Nicholas J. Pauley (57) ABSTRACT

Techniques for improved handoff searching in asynchronous systems, such as W-CDMA, are disclosed. In one aspect, a two-step search procedure is used when a list of neighbor codes is known. In the first step, a received signal is correlated with a slot timing code to locate on or more pilots and the slot boundaries associated therewith. In the second step, the received signal is correlated with each of the list of codes at the slot boundaries identified with pilots in the first step to identify the pilot code and the frame timing associated with each pilot. Various other aspects of the invention are also presented. These aspects have the benefit of decreasing search time, which translates to increased acquisition speed, higher quality signal transmission, increased data throughput, decreased power, and improved overall system capacity.

6 Claims, 5 Drawing Sheets

METHOD & APPARATUS FOR W-CDMA HANDOFF SEARCHING

BACKGROUND

1. Field

The present invention relates generally to communications, and more specifically to a novel and improved method and apparatus for W-CDMA handoff searching.

2. Background

Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards.

Pseudorandom noise (PN) sequences are commonly used in CDMA systems for spreading transmitted data, including transmitted pilot signals. The time required to transmit a single value of the PN sequence is known as a chip, and the rate at which the chips vary is known as the chip rate. CDMA receivers commonly employ RAKE receivers. A rake receiver is typically made up of one or more searchers for locating direct and multipath pilots from one or more base stations, and two or more multipath demodulators (fingers) for receiving and combining information signals from those base stations.

Inherent in the design of direct sequence CDMA systems is the requirement that a receiver must align its PN sequences to those of a base station. For example, in IS-95, each base station and subscriber unit uses the exact same PN sequences. A base station distinguishes itself from other base stations by inserting a unique time offset in the generation of its PN sequences (all base stations are offset by an integer multiple of 64 chips). A subscriber unit communicates with a base station by assigning at least one finger to that base station. An assigned finger must insert the appropriate offset into its PN sequence in order to communicate with that base station. An IS-95 receiver uses one or more searchers to locate the offsets of pilot signals, and hence to use those offsets in assigning fingers for receiving. Since IS-95 systems use a single set of in-phase (I) and quadrature (Q) PN sequences, one method of pilot location is to simply search the entire PN space by correlating an internally generated PN sequence with different offset hypotheses until one or more pilot signals are located.

Other systems, such as W-CDMA systems, differentiate base stations using a unique PN code for each, known as a primary scrambling code. The W-CDMA standard defines two Gold code sequences for scrambling the downlink, one for the in-phase component (I) and another for the quadrature (Q). The I and Q PN sequences together are broadcast throughout the cell without data modulation. This broadcast is referred to as the common pilot channel (CPICH). The PN sequences generated are truncated to a length of 38,400 chips. The period of 38,400 chips is referred to as a radio frame. Each radio frame is divided into 15 equal sections referred to as slots.

It is possible to search for W-CDMA base stations in the manner described for IS-95 systems, described above. That is, the entire PN space can be searched offset by offset (38,400 of them) for each of the 512 primary codes. However, this is not practical due to the excessive amount of time such a search would require. Instead, the W-CDMA standard calls for base stations to transmit two additional synchronization channels, the primary and secondary synchronization channels, to assist the subscriber unit in searching efficiently. As a result, W-CDMA search can be performed in three steps, which will be detailed more fully below.

For initial acquisition, the three-step W-CDMA search provides a great performance increase, in terms of reduced search time, over the impractical alternative of searching the entire PN space for each scrambling code. When the primary scrambling codes of neighboring base stations are known, either of the two methods can be used to successfully perform handoff searching, but each poses certain drawbacks in terms of search time, identified in further detail below.

Search time is an important metric in determining the quality of a CDMA system. Decreased search time implies that searches can be done more frequently. As such, a subscriber unit can locate and access the best available cell more often, resulting in better signal transmission and reception, often at reduced transmission power levels by both the base station and the subscriber unit. This, in turn, increases the capacity of the CDMA system (either in terms of support for an increased number of users, or higher transmission rates, or both).

Decreased search time is also advantageous when a subscriber unit is in idle mode. In idle mode, a subscriber unit is not actively transmitting or receiving voice or data, but is periodically monitoring the system. In idle mode, the subscriber unit can remain in a low power state when it is not monitoring. Reduced search time allows the subscriber unit to spend less time monitoring, and more time in the low power state, thus reducing power consumption and increasing standby time.

The benefits of reduced search time are clear, and some issues associated with searching in asynchronous systems, such as W-CDMA, have just been highlighted, including handoff search. There is therefore a need in the art for improved search techniques for asynchronous systems, including handoff searching.

SUMMARY

Embodiments disclosed herein address the need for improved handoff searching in asynchronous systems such as W-CDMA. In one aspect, a two-step search procedure is used when a list of neighbor codes is known. In the first step, a received signal is correlated with a slot timing code to locate on or more pilots and the slot boundaries associated therewith. In the second step, the received signal is correlated with each of the list of codes at the slot boundaries identified with pilots in the first step to identify the pilot code and the frame timing associated with each pilot. Various other aspects of the invention are also presented. These aspects have the benefit of decreasing search time, which translates to increased acquisition speed, higher quality signal transmission, increased data throughput, decreased power, and improved overall system capacity.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
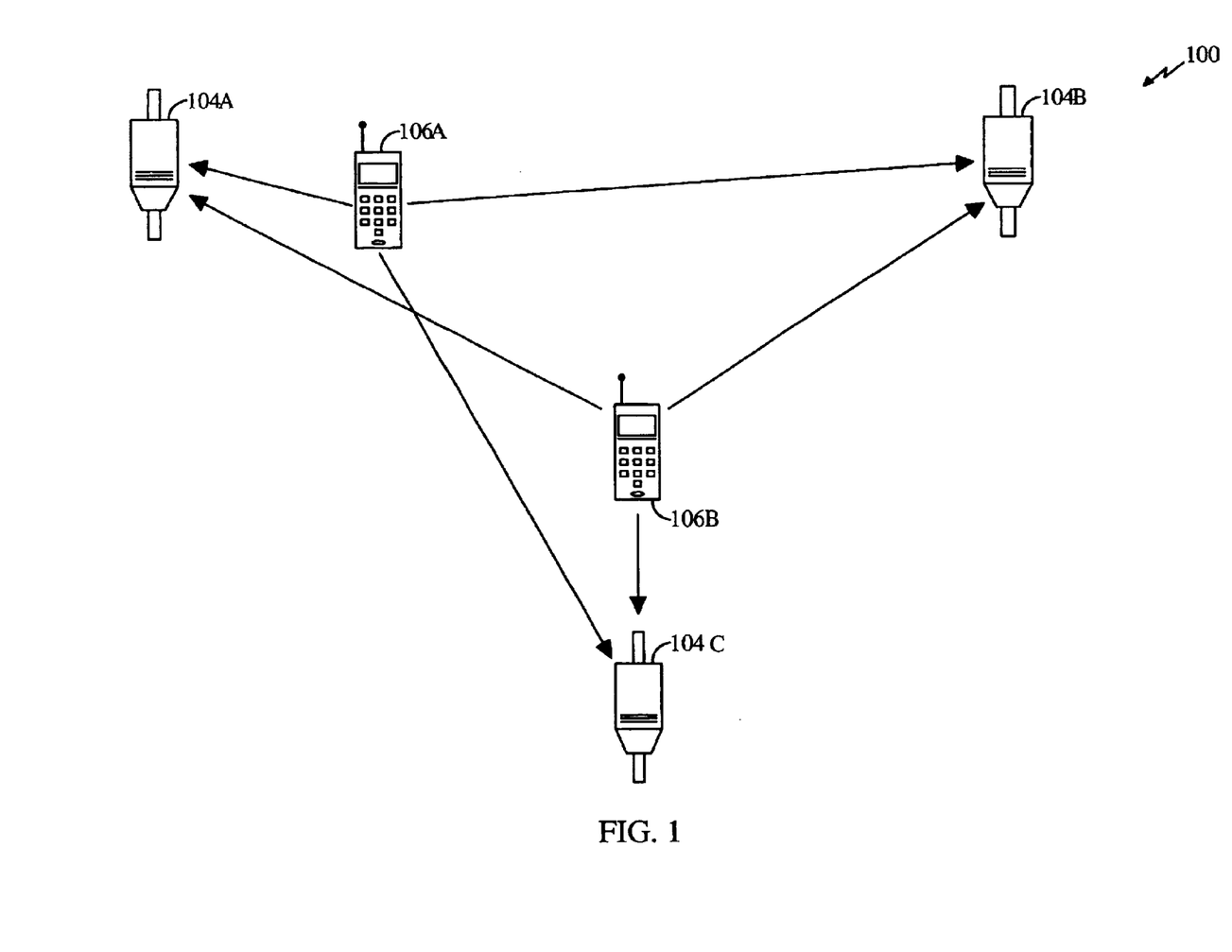
FIG. 1 is a general block diagram of a wireless communication system capable of supporting a number of users.

FIG. 1 is a diagram of a wireless communication system 100 that supports a number of users, and which can implement various aspects of the invention. System 100 may be designed to support one or more CDMA standards and/or designs (e.g., the W-CDMA standard, the IS-95 standard, the cdma2000 standard, the HDR specification). For simplicity, system 100 is shown to include three base stations 104 in communication with two subscriber units 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the term access point. The term subscriber unit can be used interchangeably with the terms user equipment (UE), mobile station, subscriber station, access terminal, remote terminal, or other corresponding terms known in the art. The term mobile station encompasses fixed wireless applications.

Depending on the CDMA system being implemented, each subscriber unit 106 may communicate with one (or possibly more) base stations 104 on the forward link at any given moment, and may communicate with one or more base stations on the reverse link depending on whether or not the subscriber unit is in soft handoff. The forward link (i.e., downlink) refers to transmission from the base station to the subscriber unit, and the reverse link (i.e., uplink) refers to transmission from the subscriber unit to the base station.

For clarity, the examples used in describing this invention will assume base stations as the originator of signals and subscriber units as receivers and acquirers of those signals, i.e. signals on the forward link. Those skilled in the art will understand that subscriber units as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

Recall that W-CDMA searching can be carried out using a three-step procedure. In step one, the subscriber unit searches for the primary synchronization code (PSC), a component of the primary synchronization channel. The PSC is a fixed 256-chip sequence that is transmitted during the first 256 chips of each 2,560-chip slot. The PSC is the same for every cell in the system. The PSC is useful for detecting the presence of a base station, and once it is acquired, slot timing is also acquired.

In step two, the subscriber unit searches for the secondary synchronization codes (SSCs), which make up the secondary synchronization channel. There are 16 256-chip SSCs. Base stations transmit 15 SSCs per frame, one SSC in each slot. There are 64 unique sequences of 15 SSCs, each sequence being associated with one of 64 scrambling code groups. Each base station transmits one SSC, along with the PSC, in the first 256 chips of every slot (each of the 16 SSCs and the PSC are orthogonal). The set of 64 SSC sequences are selected to be comma free; that is, no sequence is equal to a cyclic shift of any of the other sequences or any non-trivial cyclic shift of itself. Because of this property, once a subscriber unit determines the sequence of SSCs transmitted in any 15 consecutive slots, it can determine both the frame timing and which of the 64 SSC sequences was transmitted, thus identifying the scrambling code group in which the base station belongs. Since there are eight codes in each scrambling code group, the number of candidates has been reduced to eight.

In step three, the eight scrambling code candidates identified in step two must be searched to determine which one is the correct code. This can be carried out by performing a chip-by-chip correlation, similar to the process described for IS-95, accumulating energies over some number of chips until a decision can be made.

Once the three-step search procedure is complete and a base station has been acquired, search tasks are still ongoing. For example, neighboring base stations must be periodically searched to determine which, if any, are suitable for handoff. The base station already acquired can provide a list of potentially accessible base stations, known as a neighbor list. In addition, the primary scrambling codes of the base stations in the neighbor list can be identified. In a synchronous system, that is, one where the frame timing of base stations in the system are synchronized, such as IS-95 or cdma2000, performing a neighbor search can be very quick. This is so because only a small window around the known frame boundaries for each base station needs to be searched. However, in an asynchronous system, such as W-CDMA, knowledge of the neighbor list and associated scrambling codes is not sufficient since the frame timing is unknown. A search must still be performed to find the asynchronous base station neighbors. Searching for neighboring base stations while one or more base stations have been already acquired will be referred to herein as handoff searching, since one of the purposes for such searching is to facilitate handoffs. However, the term handoff searching is not limited to situations in which a handoff actually occurs.

Two straightforward procedures for acquiring the frame timing of neighbor base stations include those referenced above. One procedure is to search the entire space of 38,400 chips for each scrambling code. For each hypothesis, the subscriber unit needs to integrate over a certain number of chips to average down the noise, thereby increasing the probability of detection. Note that this method, while impractical for initial acquisition, is feasible when the number of scrambling codes, such as those included in a neighbor list, is relatively small.

The second method is to perform the three-step search procedure described above. First slot timing is acquired by searching for the PSC. Second, frame timing is acquired by searching for the SSC, as well as narrowing down the scrambling code to at most one of eight hypotheses. In some cases, since the neighbor list is relatively small, and therefore the number of potential scrambling codes is a subset of the total number of scrambling codes, learning the SSC may be sufficient to identify which scrambling code is being transmitted. Or, at least, the set of hypotheses may be reduced from the eight identified by the SSC sequence. Third, for each remaining hypothesis, the subscriber unit searches for the scrambling code in a small window around the frame boundaries identified in the second step. Searching in each step requires the subscriber unit to integrate over a certain number of chips to average down the noise and increase the probability of detection.

There are certain drawbacks to using either of the two methods just described, which affect the overall search time required for handoff searching. Since the first method searches over 38,400 hypotheses, there is an increased chance of false detection due to noise. As mentioned, to combat this, the subscriber unit integrates over a large number of chips to attain the desired probability level. This type of integration may require a neighbor search to encompass multiple frames. In addition, in handoff searching, typically only the strongest few neighboring cells are desired. However, using the first method requires that the entire neighbor list be searched in order to find the strongest few. In other words, the search time scales linearly with the total number of neighbors, not with the number of strongest neighbors.

The second method does not suffer from the weakness of requiring a total neighbor list search to identify a few strong candidates. This is because the strongest PSCs received in step one will tend to correspond to the strongest candidates, so only those few strong candidates need to be searched in the subsequent steps two and three. However, recall that the PSC and SSC are transmitted only during the first 256 chips of the 2560 chip slot. Therefore, in both steps one and two, in order to integrate over a large number of chips, the subscriber unit must wait 2560 chips for every 256 chips worth of integration. In addition, the primary and secondary synchronization channels are typically transmitted at lower strength than the primary scrambling code, and are not orthogonal to it. These additional factors increase the amount of time required to integrate in order to achieve a desired level of performance. Step two, identifying the SSC, is even more sensitive to the integration time increase, since it may need to be repeated for more than one slot hypothesis returned by step one, thus increasing the overall handoff search time.

Figure 2:
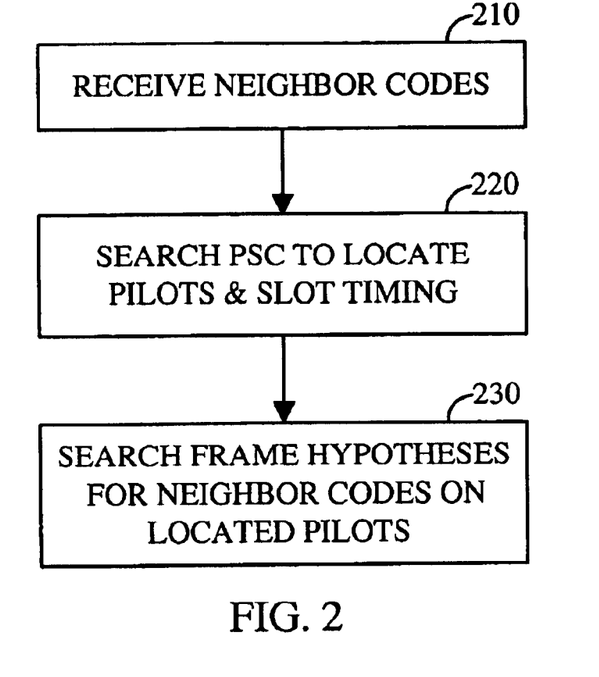
FIG. 2 depicts a two-step handoff searching method.

Various embodiments of the present invention combine aspects of the two search methods, described above, to perform handoff searching that avoids the drawbacks of using either procedure alone. FIG. 2 depicts a flowchart of the method of one such embodiment for performing handoff search. In block 210, the subscriber unit receives the primary scrambling codes of the neighboring base stations. The following blocks, 220 and 230, define a two-step process for searching for known primary scrambling codes, regardless of how the subscriber unit learns of the codes. Although the following embodiments are described in terms of a W-CDMA system, the principles of the present invention apply equally to any conceivable system which employs a code for identifying slot timing, and a pilot code, the beginning of whose frame timing corresponds to one of the slots in a frame.

The first step, depicted in block 220, consists of running step one of the three-step search process described above. By searching for the PSC, the slot timing of the strongest few cells can be acquired. In the process, those cells that are too weak for consideration are eliminated. Performing this step avoids the need to perform a complete search on the entire neighbor list when only the subset containing the strongest few is desired. After completion of this step, the subscriber unit will know the slot timing of several candidate base station pilots. Knowing the slot timing reduces the frame timing uncertainty to 15 frame hypotheses for each pilot, since there are 15 slots in every frame.

The second step, depicted in block 230, is to search each pilot hypothesis by testing each of the 15 slots using each of the codes in the neighbor list. The neighbor list will most likely include the primary scrambling codes of those candidate base station pilots, although it is likely that other codes (corresponding to weak cells, or cells not received) will also be in the list. For each code in the list, a small window is searched around each slot boundary identified in the first step, until the frame boundary is detected (or 15 slots have been tested and the code is not detected on the pilot). The process can be repeated until all the pilot hypotheses (i.e. base station candidates) in the subset detected in step one have been identified with a primary scrambling code and the frame timing acquired.

In some instances, where a signal detected in step one is from a base station not on the neighbor list (or otherwise in the list of known base stations for searching), the subscriber unit can take one of a number of steps. The subscriber unit can ignore that base station, because it is not in the list. Or, it can continue on with the last two steps of the three-step search process described above, until the base station is identified. The subscriber unit may send a message to a base station it is already in communication with to update the neighbor list with the new candidate.

Figure 3:
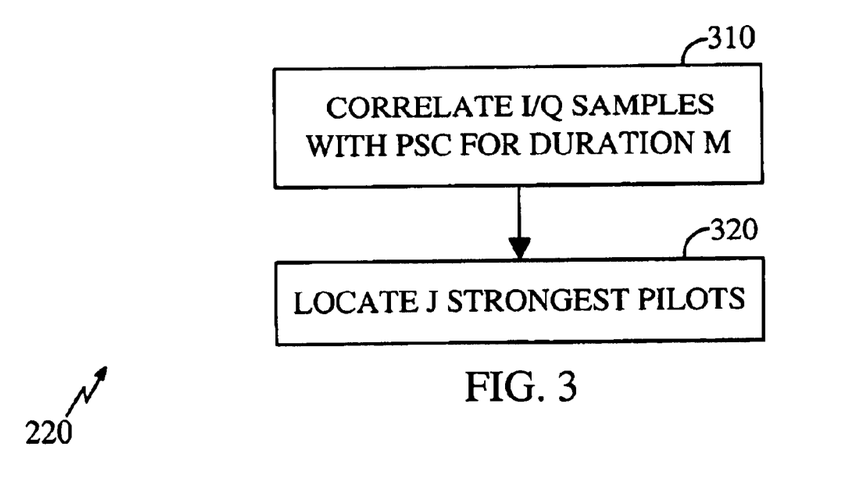
FIG. 3 depicts a detailed embodiment of the first step of the two-step handoff searching method.

FIG. 3 depicts an embodiment of step 220 described above in FIG. 2. Recall that step 220 is the first step of a two-step search process for locating neighboring pilots when a list of potential neighbor pilots and their corresponding codes are known. In step 310, the incoming I and Q samples (for example, received from an RF downconvert block, such as block 620 depicted in FIG. 6 and detailed below) are correlated with the PSC for duration M. M can be defined as any time value, but a convenient choice would be M chips, M slots, or M frames. Since the various pilots being searched for are asynchronous, to find all the strongest candidates it is desirable to search each offset in an entire slot, which includes 2,560 chips. Typically, searching is done on half-chip increments to account for uncertainty in chip alignment, so the total number of hypotheses to test in a slot is twice the number of chips, or 5,120. Choosing a relatively large value for M will result in more accurate energy measurements of the various hypotheses, with the tradeoff of increased search time. A variety of means for correlating sequences such as the PSC with incoming I and Q samples are known in the art, and one embodiment operable with the steps depicted in FIG. 3 will be detailed below with respect to FIG. 7. Also known in the art are techniques for employing multiple correlators in parallel, so as to reduce the search time.

In step 320, a number of the strongest pilots, J, are located from the correlation results of step 310. As described above with reference to FIG. 2, it is advantageous to spend search resources, including associated hardware and search time, on the strongest pilots available to the subscriber unit. One alternative is to fix J to a set amount and sort the results to find only the J highest pilots (and if less than J pilots are located, then use all the available pilots). Another alternative is to use a minimum energy threshold and set J to match the total number of pilots meeting or exceeding that threshold. Yet another alternative is to vary the minimum threshold depending on the energy of and/or number of pilots actually located. The J pilots located will be used in the second step of the two-step search process described above, step 230.

Figure 4:
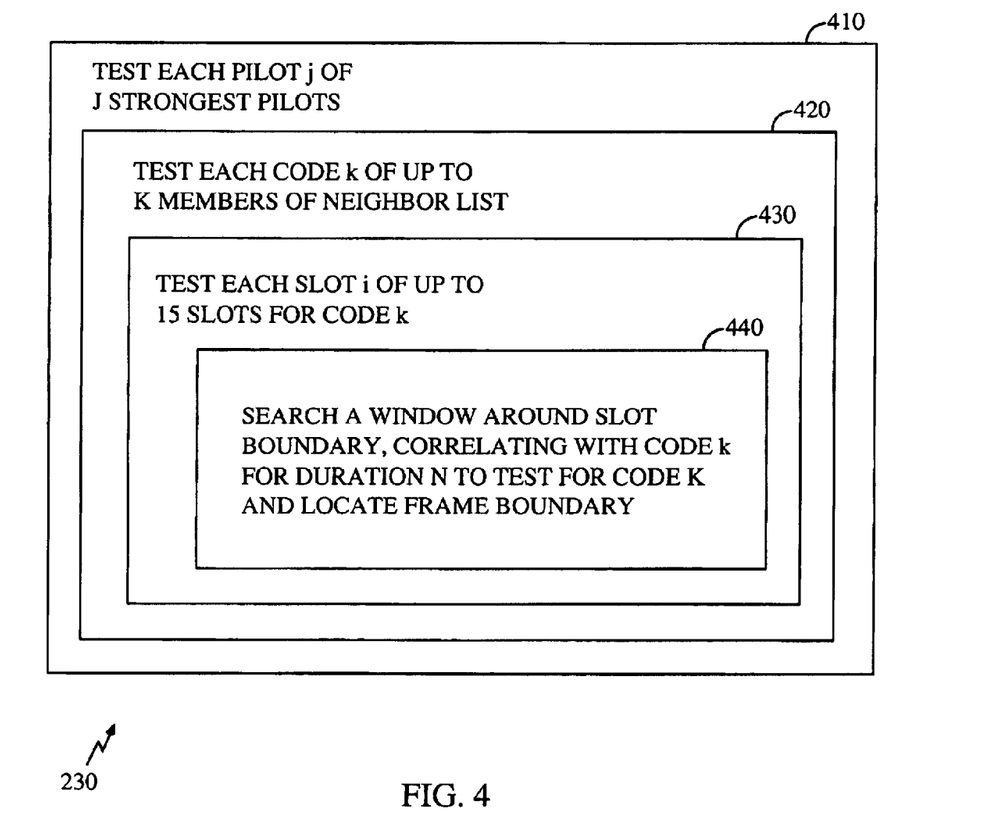
FIG. 4 depicts a detailed embodiment of the second step of the two-step handoff searching method.

FIG. 4 depicts an embodiment of step 230 described above in FIG. 2. Recall that step 230 is the second step of a two-step search process for locating neighboring pilots when a list of potential neighbor pilots and their corresponding codes are known. In FIG. 4, four steps, 410, 420, 430, and 440, correspond to four nested loops. A step which is nested in another step is depicted as a box located within an outer box corresponding to the other step.

In step 410, each pilot j of the J strongest pilots determined in the first step of the two-step search process, 230, is tested to determine if one or more of the codes corresponding to base stations in the neighbor list is transmitting on pilot j. In general, since the neighboring base stations are asynchronous, only one base station is likely to be found on a pilot j. However, it is possible that two neighboring base stations may be temporally synchronous, so the designer of the embodiment may want to search for more than one pilot code for each pilot j located. Alternatively, if the likelihood of that event occurring is low, the designer may end the test for a pilot j once a single base station can be associated with it. Details of both alternatives just described are provided below in the embodiment described in FIG. 5.

Step 420 is nested within step 410. For each code k of up to K members of the neighbor list, a test is made to determine if code k is present on pilot j. Accounting for the situation where more than one pilot may be temporally synchronized with other base stations, a total of K tests may be performed for a single pilot j. In a somewhat brute-force deployment of this embodiment, step 420 can be applied with every code k on every pilot j. However, if a code k has been found to exist on a previously tested pilot j, that code need not be tested for subsequent pilots since each base station transmits a unique pilot. Taking this into account in deployment, as one or more codes k are associated with one or more pilots j, the number K can be reduced for subsequent rounds of step 420, reducing the search time required.

In each round of step 420, a code k is tested for pilot j. If, after testing all of the K neighbor codes, none of the codes are located on pilot j, then that pilot does not correspond to one of the codes in the neighbor list. The subscriber unit can handle this situation a number of ways. One way is to simply ignore pilot j and proceed to test the next pilot in step 410. Alternatively, a traditional 3-step WCDMA search can be performed to determine which base station pilot j corresponds to, and that information can be relayed to the system to add the new base station to the neighbor list. Depending on the likelihood, in a particular system deployment, of a subscriber unit having access to neighbors not contained in the neighbor list, either of the above alternatives can be chosen by the system designer.

Step 430 is nested within step 420. Recall that locating each pilot j of the J strongest pilots also determines the slot timing of that pilot. In step 230, of which step 430 is a sub-step, the frame timing is to be determined as well as the code k associated with each pilot. Therefore, each slot i of up to 15 slots must be tested for each code k. Note that 15 slots tested is the maximum required. If a code k is located before 15 slots have been tested, the code and the frame timing have been determined. There is therefore no need to continue with step 430 for a particular code k once any slot i is identified with that code k. Again, a somewhat brute-force deployment of this embodiment would test all 15 slots for each code k, but search time is reduced if step 430 is terminated for a code k once frame timing is determined. If code k is not located once all 15 slots have been tested, a determination is made that pilot j is not associated with the base station transmitting pilot j, and the next code k in step 420 is tested.

Step 440 is nested within step 430. In this step, a window surrounding the slot boundary identified with pilot j in step 220 is searched. This searching is accomplished by correlating code k at each hypothesis in the search window. Typically the window will be searched in half-chip increments, using correlation techniques known in the art. Each hypothesis will be correlated for duration N. Again, N can be any time measure, but convenient choices are chips, slots or frames. Choosing a relatively large value for N will result in more accurate energy measurements of the various hypotheses, with the tradeoff of increased search time. A variety of means for correlating sequences such as code k with incoming I and Q samples are known in the art, and one embodiment operable with the steps depicted in FIG. 3 will be detailed below with respect to FIG. 7. Also known in the art are techniques for employing multiple correlators in parallel, so as to reduce the search time. Note that the pilot transmitted by the base station is continuously transmitted, so the search of code k can accumulate energy from a continuous stream of chips. Therefore, leaving aside parallel searchers for the sake of clarity, an example of accumulating N=2,560 chips requires a duration of 2,560 chip times. In contrast, the PSC is transmitted only in the first 256 chips of each 2,560 chip slot, so accumulating M=2,560 chips in step 220 requires 25,600 chip times. The same 10:1 ratio of frames to slots holds for SSC searching, described above. Recall that this is one of the advantages of spending time searching for pilot codes, such as code k, in comparison with spending time searching for SSC codes (a step not required in the present invention). Adding parallel searchers to this example changes the calculated chip times, but the relative advantage remains the same.

The advantages of searching a window around the slot boundary include mitigating against changes in offset due to Doppler or drift, uncertainty in the exact slot timing, and location of multipath signals corresponding to a single base station. However, increased window size translates to increased search time. This embodiment can be deployed without windowing (i.e. a window size of one), and then step 440 becomes a single correlation step. Any window size can be employed within the scope of the present invention.

Step 440 can be terminated if, at any time during the window search, an offset is located with sufficient energy. Terminating the search naturally reduces search time. Various other termination algorithms will be clear to those skilled in the art, such as terminating the window search once a predetermined number of multipath signals have been located above a threshold. Or, the entire window can be searched without determination of whether or not a pilot is located. After the window search is completed, the determination of detection of one or more pilots and associated multipath signals can be made using a peak detection and/or sorting process on the energies calculated from each hypothesis in the window.

Figure 5:
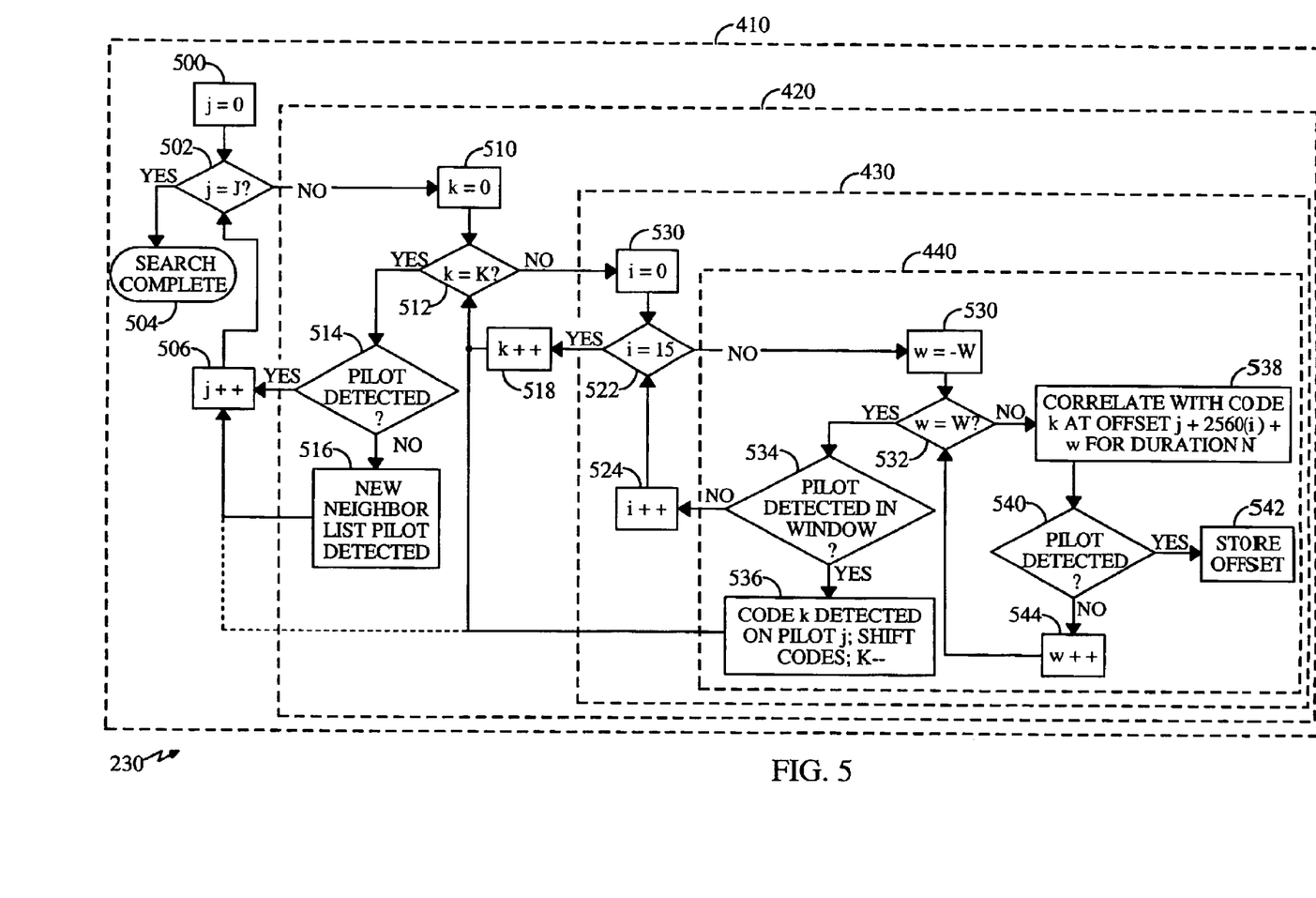
FIG. 5 depicts an embodiment of the second step of the two-step handoff searching method, with further detailed sub-steps.

FIG. 5 depicts a flow chart detailing an embodiment of the second step of the two-step search process 230, described above. Dashed boxes indicate the portions of the flow chart corresponding to steps 410–440, described above. Step 440 includes steps 530–544. Step 430 has step 440 nested within it, as well as steps 520–524. Step 420 has step 430 nested within it, as well as steps 510–518. Step 410 has step 420 nested within it, as well as steps 500–506.

The process begins in step 500, where j is set to zero to initialize the pilot loop. Proceed to decision block 502, where j is tested for equality with J. When j equals J, the loop will be completed as each of the J strongest pilots will have been tested. Move to the Search Complete block 504. When j is not equal to J, then pilot j must be tested to determine which, if any, of the codes in the neighbor list correspond to pilot j. Proceed to block 510, to initiate the nested step 420 and test pilot j.

In block 510, k is set to zero to initialize the code loop. Proceed to decision block 512 to determine if k equals K. If so, then all the codes remaining to be tested in the neighbor list have been tested for pilot j. Proceed to decision block 514. In decision block 514, if one or more pilots from the neighbor list were located on pilot j, then the pilot and frame timing were determined, proceed to block 506. In block 506, j is incremented by one, and the flow proceeds to block 502 to test if any of the J strongest pilots remain to be tested. If, in decision block 514, no code k of the K codes tested was located on pilot j, then pilot j is from a base station not represented in the neighbor list. Proceed to block 516, where action is taken appropriate to the situation, such as that described above. One example is to complete a three-step WCDMA search to determine which code is on pilot j. Subsequently, that code can be reported back to the system where it can be added to the neighbor list. Alternatively, pilot j can be ignored if it is not contained in the neighbor list. Once the appropriate action is taken, proceed to block 506, increment j, and test to see if any additional pilots need to be tested in block 502. If the system is to be designed such that no action is taken when a pilot j is not found to correspond with any of the K members of the neighbor list, then steps 514 and 516 can be removed, with the flow from decision block 512 going straight to block 506 when k is equal to K.

In decision block 512, if k is not equal to K, then additional codes remain for testing on pilot j. Proceed to block 520 to initiate the nested step 430 and to test code k. In block 520, i is set to zero to initialize the slot loop. As described above, each slot of the 15 slots must be tested with code k on pilot j until a slot matches or all 15 have been exhausted. Proceed to decision block 522 to determine if i is equal to 15. If so, then all 15 slots have been tested, and code k has not been located on pilot j. Proceed to block 518 to increment k by one. From block 518 proceed to decision block 512 to test if additional codes need to be tested for pilot j.

If, in decision block 522, i is not equal to 15, then proceed to block 530 to initiate nested step 440 and to test slot i. In block 530, w is set to −W to initiate the window loop. In this loop, w represents the offset in the window and will range from −W to W−1. Various windowing schemes will be clear to those skilled in the art and are within the scope of the present invention. Proceed to decision block 532 to test if w is equal to W. If so, the window is complete, proceed to decision block 534. In decision block 534, test if one or more pilots were detected corresponding to code k at slot i on pilot j. If not, then proceed to block 524, increment i by one, and proceed to decision block 522 to determine if additional slots remain to be tested.

In block 534, if one or more pilots were detected in the window corresponding to code k at slot i on pilot j, then there is no need to search any additional slots, since the frame timing only aligns with one of the 15 slots. Therefore, the slot loop can be terminated for code k. (A slightly simpler, yet more brute-force alternative, to this embodiment is to continue searching all the slots even if one is already determined to identify the frame timing and the code. On average, employing such an alternative will increase search time, with no performance gain. This alternative is not shown in FIG. 5.)

Furthermore, only one pilot will be transmitted using code k, although that one pilot may be received at multiple offsets due to multipath propagation. There are a variety of techniques to eliminate the need to search for a code k, once located, in tests of any of the J pilots remaining. As a result, subsequent search steps will require fewer code searches, and net search time will be reduced.

When each of the J pilots to be tested comes from a unique base station, then once a code k is located for a pilot j. There is no need to search for that code k on subsequent pilots. However, it is possible that more than one of the strongest pilots, located in step one, are actually multipath components of a single transmitted pilot signal. If code k, detected on the first such pilot j, is not searched on the remaining of such pilots, then the code for those remaining multipath pilots will not be identified. A time-consuming three-step WCDMA search may be initiated, only to find out that the pilot corresponds to a code k eliminated from the neighbor list. One resolution is to remove code k from consideration only on pilots which are outside of the multipath profile of pilot j on which code k was first found (that is, those pilots whose offset is far enough away from pilot j that it is unlikely for them to be multipath components of the same transmitted pilot signal).

Another alternative is to size the search window such that all offsets required to cover the maximum delay spread for the propagation environment are included. Using this alternative, code k will be tested for all the likely multipath pilots during one window search. Therefore, any of the J pilots remaining to be tested which are actually multipath components of pilot j (thus also using code k) will be identified during the window search, and code k can be eliminated from all subsequent searches. In addition, if code k is located at another offset within the search window, and that offset corresponds to one of the J pilots remaining to be tested, then that pilot is associated with at least one code, code k. In this case, an option (not shown in FIG. 5) is to eliminate the subsequent pilot from the list, and decrement J by one, thus reducing the overall search time. This option would be employed when, as described above, it is not desirable to search for multiple codes corresponding to a single pilot.

In yet another alternative, when code k is not detected at the slot boundary detected in step one, or in a small window around that boundary (to account for variances introduced since the search in step one), then do not search the larger window corresponding to the multipath profile, as described above. It only becomes necessary to look for additional multipath components when a first component is found. Using varying window sizes in this manner provides the flexibility to quickly find all multipath components for a code k, thus reducing search time by eliminating code k and one or more of the J pilots remaining, without adding the increased burden of searching a larger window for each code/slot hypothesis. This option is not shown in FIG. 5.

To remove code k from the list of K neighbor codes being tested, proceed to block 536. If an indexing scheme is being employed to keep track of the K codes, the remaining codes should be shifted down one. Then K can be decremented by one. Since the remaining codes have been shifted, there is no need to increment k, as it already points to the next code to be tested, if any. Various other looping and indexing schemes known in the art can be substituted for the exemplary loop in this embodiment. These substitutions are within the scope of the present invention. K is now one smaller than before, and so each subsequent use of step 420 will be correspondingly shorter in terms of search time. As codes are associated with pilots, the search time for the remaining pilots will continue to be reduced. (Again, a somewhat simpler, yet more brute-force, alternative is to search each code in tests of all subsequent pilots j and leave K unchanged, even when no additional pilots j will correspond to code k. Using techniques to handle multipath pilots, described above, employing such an alternative will increase search time, with no performance gain. This alternative is not shown in FIG. 5.)

As described above, this embodiment can be configured to search for additional codes on a single pilot once a first code k has been associated with it. This is shown in FIG. 5, as the flow proceeds from step 536 to decision block 512 where additional codes k, if any, will be tested on pilot j (the pilot just determined to be associated with the prior code k). (Recall that k is not updated because the neighbor list was edited, and K has been decremented. If the code k tested in this loop was the last in the list, i.e., k is equal to K−1, then decrementing K in step 536 will cause k to equal K when step 512 is performed, and the loop will terminate.) An alternative is shown as a dashed line between step 536 and 506. If the probability that two codes will exist synchronously on a single pilot j is determined to be too small, or the effects of ignoring additional pilots is determined to be acceptable, then once a pilot j is associated with any code k, the pilot loop can be terminated and the remainder of the J strongest pilots can be tested. Thus the solid line between step 536 and decision block 512 is removed. There is no need to test additional codes k once one has been found. Instead, proceed to block 506, increment j by one, decide if there are remaining pilots to test, and proceed accordingly.

When, in decision block 532, w is not equal to W, then proceed to step 538 to test offset w, slot i, code k, and pilot j. This is done by correlating the incoming I and Q samples with code k at the offset determined by computing offset j+2560(i) +w. Offset j is the offset corresponding to pilot j, determined in the first step 220 of this two-step search procedure. The correlation proceeds for duration N, which can be any time period, but a convenient measure for correlation time would be chips, slots, or frames. Once the correlation for offset w is completed, proceed to decision block 540 to determine if the pilot j with code k has been detected. One example is to compute the energy received and compare it with a threshold. If a pilot is detected, proceed to step 542 and store this offset in a manner in which the associated pilot and code can be identified with it. Other parameters may also be stored, such as the energy calculated. After storing in step 542, or if no pilot was detected in decision block 540, proceed to step 544, increment w by one, and proceed to decision block 532 to determine if additional offsets in the window remain to be tested. As discussed previously, to locate more than one multipath signal, or to compensate for drift or uncertainty in the slot timing determined in step 220, it may be desirable to search the entire window even if an acceptable signal is located. Alternatively, the window loop can be terminated early once a sufficient number (including only a single one) of signals have been located with acceptable energy. The details of terminating the window loop early are not shown in FIG. 5, but will be clear to those of skill in the art.

An alternative to steps 540 and 542 can be employed as follows (details not shown in FIG. 5). Instead of testing for pilots at each offset, energies for the entire window can be calculated and stored. Then, those energies can be peak detected and sorted (using techniques known in the art, or the embodiment depicted below in FIG. 7). One or more of the offsets exceeding a threshold, if any, can be used to make a determination that code k has been located, as well as the frame timing associated therewith. This technique also lends itself well to correlators designed for searching windows without intervention, which are known in the art, as well as deployment of parallel searchers for correlating more than one offset at once.

Yet another alternative for making a pilot detection decision is to combine the energies from a number of detected multipath components corresponding to a code k, and compare the combined energy to a threshold. If the combined energy exceeds the threshold, the pilot is detected, even though no single component of the multipath may exceed the required threshold.

Figure 6:
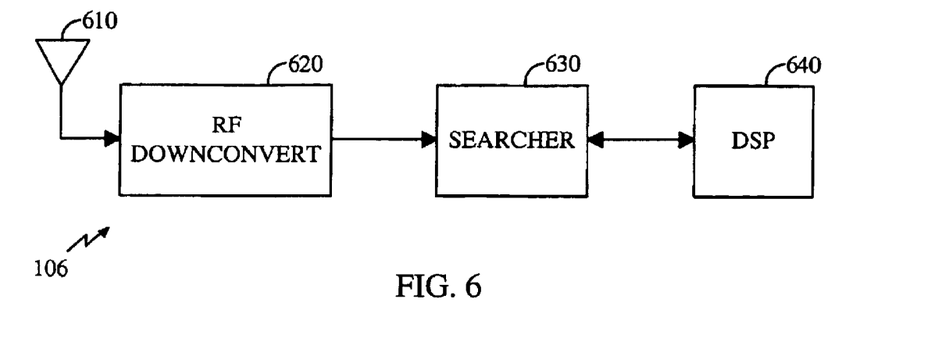
FIG. 6 depicts an embodiment of a subscriber unit configured in accordance with an exemplary embodiment of the present invention.

FIG. 6 shows an embodiment of subscriber unit 106, configured for use with method embodiments such as those just described. Only a subset of the components of a subscriber unit are shown. Signals are received at antenna 610, and delivered to RF downconvert block 620 for amplification, downconversion, and sampling. Various techniques for downconverting CDMA signals to baseband are known in the art. From RF downconvert block 620, I and Q samples are delivered to searcher 630. Searcher 630 is in communication with a digital signal processor (DSP) 640. Alternatives to employing a DSP include using another type of general purpose processor, or specialized hardware designed to carry out various tasks related to searching that might be employed in the DSP. Depending on the capabilities of searcher 630, DSP 640 will carry out various tasks described in the methods above, and coordinate the performance of the remaining tasks in searcher 630. While only one searcher 630 is shown in FIG. 6, any number of searchers can be implemented in parallel in accordance with principles of the present invention. Searcher 630 will ultimately deliver energy values corresponding to offsets to DSP 640. The offsets may be delivered as sorted, detected peaks, if the capability exists in Searcher 630. Or, raw energy values may be delivered for further processing in the DSP.

Figure 7:
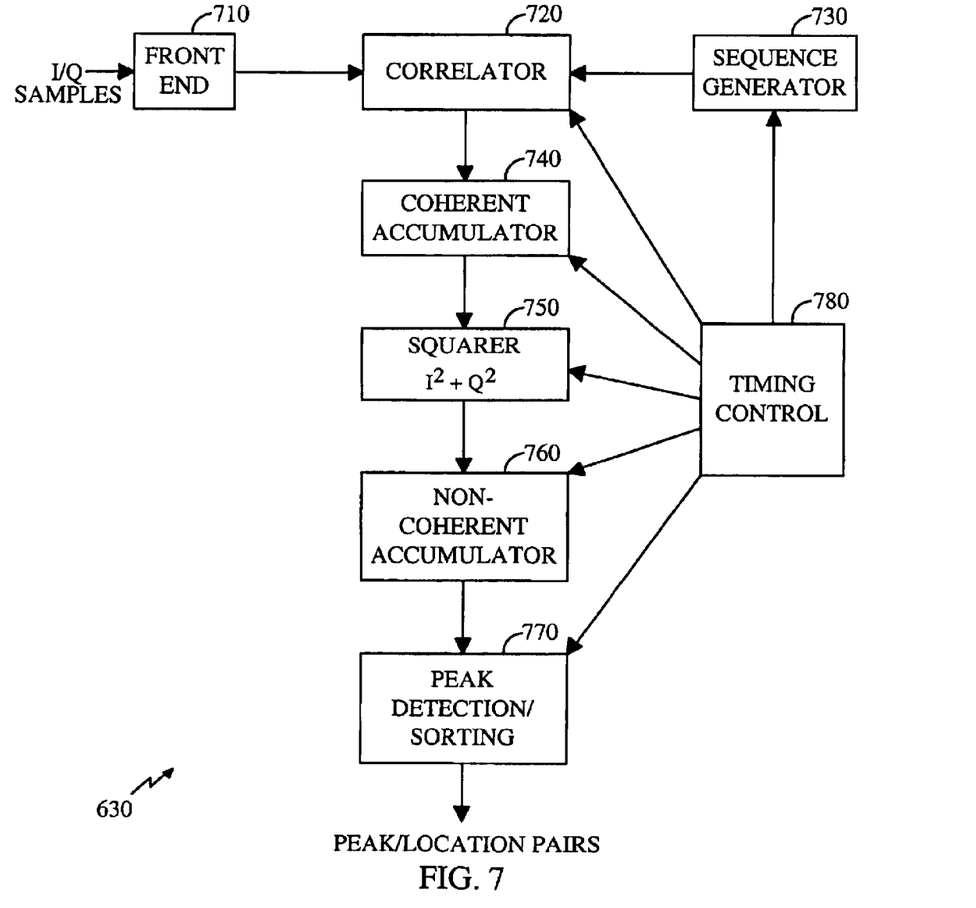
FIG. 7 depicts an embodiment of a searcher configured in accordance with an exemplary embodiment of the present invention.

FIG. 7 depicts an embodiment of searcher 630. This embodiment can be adapted to perform PSC searching, required for step one of the two-step search method 220, as well as PN searching such as that required for step two of the two-step search method 230. I and Q samples are delivered to front end 710, where various procedures may be employed such as decimation, code Doppler adjustment, and frequency rotation. The adjusted I and Q samples are delivered to correlator 720. The I and Q sequences are correlated with a sequence delivered to correlator 720 from sequence generator 730. The sequence can be the PSC sequence to perform step 220 (or associated step 310), or the PN sequence associated with a code k in step 230 (or associated steps 440 or 538). Various correlators are known in the art which despread the I and Q samples with the sequence from sequence generator 730 and produce despread I and Q sums of one or many chips for each offset tested. The results are delivered to coherent accumulator 740, where the I and Q sums from correlator 720 are accumulated individually (thus the accumulation is coherent). For correlators which produce multiple outputs corresponding to multiple tested offsets, coherent accumulator 740 can produce and store multiple coherent accumulations. Some portion of the correlation duration M or N, described above, can occur coherently depending on the parameters of the system deployed. The coherent I and Q accumulations are then squared in squarer 750 ($I^2+Q^2$) to produce intermediate energy values, and the results are delivered to non-coherent accumulator 760. Non-coherent accumulator 760 accumulates the energy values until the correlation duration M or N has passed, depending on whether step one or step two is being processed, respectively. Again, for correlators which process multiple offset hypotheses concurrently, non-coherent accumulator 760 can store multiple energy accumulations for those hypotheses. The energy values calculated in non-coherent accumulator 760 are then delivered to peak detection and sorting block 770, where energy peaks are located and those peaks are sorted to produce a list of highest to lowest energies with their associated offsets. These peak/location pairs can then be delivered to DSP 640, for example.

The various blocks communicate with timing control block 780, which provides sequencing of the coherent and non-coherent accumulations, and other control necessary for multiple offset hypothesis testing, if deployed. Other searcher embodiments may include a subset of the blocks just described for FIG. 7, with the remaining tasks carried out in a DSP such as DSP 640, or special purpose hardware, as described above. Various configurations of searchers are known in the art, and new searchers can be developed, all of which can be deployed to produce the results described in the above embodiments, and will fall within the scope of the present invention.

It should be noted that in all the embodiments described above, method steps can be interchanged without departing from the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for searching comprising:
    correlating a received signal with a slot timing code to locate one or more pilots and slot boundaries associated therewith;
    performing a code test for each code of the list of codes, the code test comprising:
        performing a slot test for each slot corresponding to the pilot, the slot test comprising correlating the received signal with the code for a duration at an offset corresponding to the slot to generate an energy value:
        comparing each energy value to a threshold to determine if the code corresponds to the pilot;
        using the code corresponding to an energy which exceeds the threshold as a scrambling code for demodulation; and
        using the slot boundary corresponding to the energy which exceeds the threshold as the frame boundary for the scrambling code.

2. A method for searching comprising:

correlating a received signal with a slot timing code to locate one or more pilots and slot boundaries associated therewith;

correlating the received signal with the code for a duration at an offset corresponding to the slot to generate an energy value;

testing a window of offset hypotheses around the slot boundary, wherein for each offset hypothesis the received signal is correlated with the code for a duration to generate an energy values;

detecting the energy values corresponding to the offset hypotheses to locate one or more peaks;

comparing each of the peaks to a threshold to determine if the code corresponds to the pilot for each peak which exceeds the threshold, using the corresponding code as a scrambling code for demodulation; and for each peak which exceeds the threshold, using the corresponding slot boundary as the frame boundary for the scrambling code.

3. A method for searching comprising:

correlating a received signal with a slot timing code to locate one or more pilots and slot boundaries associated therewith;

correlating the received signal with the code for a duration at an offset corresponding to the slot to generate an energy vale;

testing a window of offset hypotheses around the slot boundary, wherein for each offset hypothesis the received signal is correlated with the code for a duration to generate an energy value;

detecting the energy values corresponding to the offset hypotheses to locate one or more peaks;

comparing each of the peaks to a threshold to determine if the code corresponds to the pilot; and terminating the step of testing the window of offset hypotheses around the slot when a pre-determined number of peaks are detected above the threshold.

4. A method for searching comprising:

correlating a received signal with a slot timing code to locate one or more pilots and slot boundaries associated therewith;

correlating the received signal with the code for a duration at an offset corresponding to the slot to generate an energy vale;

testing a window of offset hypotheses around the slot boundary, wherein for each offset hypothesis the received signal is correlated with the code for a duration to generate an energy value;

detecting the energy values corresponding to the offset hypotheses to locate one or more peaks;

comparing each of the peaks to a threshold to determine if the code corresponds to the pilot; and terminating the code test for the pilot when one or more peaks are detected above the threshold during the slot test.

5. A method for searching comprising:

correlating a received signal with a slot timing code to locate one or more pilots and slot boundaries associated therewith;

correlating the received signal with the code for a duration at an offset corresponding to the slot to generate an energy vale;

testing a window of offset hypotheses around the slot boundary, wherein for each offset hypothesis the received signal is correlated with the code for a duration to generate an energy value;

detecting the energy values corresponding to the offset hypotheses to locate one or more peaks;

comparing each of the peaks to a threshold to determine if the code corresponds to the pilot; and terminating the pilot test of a pilot when one or more peaks are detected above threshold during the code test.

6. A method for searching comprising:

correlating a received signal with a slot timing code to locate one or more pilots and slot boundaries associated therewith;

correlating the received signal with the code for a duration at an offset corresponding to the slot to generate an energy vale;

testing a window of offset hypotheses around the slot boundary, wherein for each offset hypothesis the received signal is correlated with the code for a duration to generate an energy value;

detecting the energy values corresponding to the offset hypotheses to locate one or more peaks;

removing the code from the list of codes for subsequent pilot tests when one or more peaks are detected above the threshold during the code test.

* * * * *